United States Patent [19]
Gregg et al.

[11] Patent Number: 4,908,815
[45] Date of Patent: Mar. 13, 1990

[54] OPTICAL RECORDING SYSTEM UTILIZING PROPORTIONAL REAL-TIME FEEDBACK CONTROL OF RECORDING BEAM INTENSITY

[76] Inventors: David P. Gregg, 3650 Helms Ave., Culver City, Calif. 90230; Stephen K. Shu, 18081 Santa Cecilia, Fountain Valley, Calif. 90708; Kitchener C. Wilson, 415 Calle Las Caleros, Santa Barbara, Calif. 93109

[21] Appl. No.: 158,535

[22] Filed: Feb. 22, 1988

[51] Int. Cl.$^4$ .............................................. G11B 7/125
[52] U.S. Cl. ................................................... 369/116
[58] Field of Search ................. 369/54, 109, 116, 111; 346/76 L, 108

[56] References Cited

U.S. PATENT DOCUMENTS

| | | | |
|---|---|---|---|
| 3,696,344 | 10/1972 | Feinleib et al. | 369/116 |
| 4,051,329 | 9/1977 | Blondet et al. | 369/116 |
| 4,283,785 | 8/1981 | Miyauchi et al. | 369/116 |
| 4,562,567 | 12/1985 | Frankfort et al. | 369/116 |
| 4,583,210 | 4/1986 | Winslow | 369/116 |

FOREIGN PATENT DOCUMENTS

52-67303  6/1977  Japan ................................... 369/111

Primary Examiner—Donald McElheny, Jr.
Attorney, Agent, or Firm—W. D. English; W. L. Chapin

[57] ABSTRACT

A system for optically recording information on a recording medium, such as a video disk, by pulse-code modulation (PCM). The medium includes a reflective and radiation-sensitive recordable stratum which changes optically in accordance with the signal being recorded. The signal is recorded on the medium by a slaved coherent light light beam whose intensity is controlled by the recording medium itself. The recording medium controls the recording beam power in a manner to reduce dropouts to a minimum and to assure fidelity in the recorded signal throughout a predetermined range of surface speeds of the medium despite irregularities in the recording stratum.

15 Claims, 4 Drawing Sheets

OPTICAL RECORDING SYSTEM UTILIZING PROPORTIONAL REAL-TIME FEEDBACK CONTROL OF RECORDING BEAM INTENSITY

BACKGROUND OF THE INVENTION

In the usual prior art optical recorders, a pulse modulated coherent laser beam is recorded on the radiation-sensitive stratum of a rotating disk, cylinder, or other appropriate medium. In the more common video disk version, the modulated laser beam records distinct pulses in tracks or grooves on the disk of micrometer width or less. The tracks or grooves form a continuous spiral path, or a series of concentric circular paths. The paths may be formed by the beam during the recording process, or the beam may be made to track pre-existing paths formed in the medium prior to the recording process.

A typical digital optical record produced by the recording process described above may consist of a series of optically transformed microspots each of which may be considered to represent a binary "1," and which are separated by other areas which may be considered to represent a binary "0." Each of the binary "1's" may have the same duration, or period; and each of the binary "0's" may a period equal to the periods of the binary "1's," or to some multiple thereof.

Because of the minute size of the recorded spots on the prior art optical recordings, errors are inevitable due to inconsistencies in the materials, as well as defects in the components and in the recording process itself. The resulting errors are usually referred to as "dropouts."

The detection of dropouts in the prior art optical recording systems has usually been based on techniques learned from the prior magnetic recording systems. In the prior magnetic recording systems, the success or failure of a first magnetic recording head to record a binary "1" is detected by a second monitoring head which is physically displaced along the recording medium from the first head. This particular monitoring technique involves a delayed analysis of the recording process, and it requires some form of re-recording in order to achieve overall substantially error-free recording. Examples of such prior art optical recording systems may be found, for example, in U.S. Pat. Nos. 4,308,612; 4,464,805 and 4,669,072. The optical recording systems disclosed in each of the patents include means for monitoring the signal being recorded. That is, each of the optical recording systems described in the patents uses a monitoring technique similar to that used in magnetic recording, and which causes the flawed segments of the recorded signals to be re-recorded in a different space on the recording medium.

U.S. Pat. No. 4,308,612, for example, makes reference to apparatus for magnetically recording digital information on a magnetic disk which includes error checking means. It is pointed out in the patent that, in optical disk systems for optically recording digital information in a sequence of binary "1's" and "0's" on a recording disk, checking operations similar to those used in magnetic recording are necessary in order to reduce dropouts.

U.S. Pat. No. 4,308,612 describes optical recording apparatus capable of performing a read-while-write operation in which a reflected beam from the recording medium is detected during recording, and the data being recorded are checked on the basis of the reflected beam. When it is found that the data being recorded are erroneous, the same data are correctly recorded on the next sector of the disk the number of times necessary to achieve acceptable results. The prior art system of U.S. Pat. No. 4,051,329 advances the art of optical recording a step further by indirectly measuring the energy of each pulse being recorded, and storing the energy in a sample-and-hold circuit for improving the recording of the next or following pulses.

The system of U.S. Pat. No. 4,562,567 advances the art of optical recording yet another step by employing two levels of intensity for the recording beam, with the second lower intensity level being initiated by a quantum drop in the monitored level of the beam reflection resulting from pit formation in the surface of the recording medium, as compared with a selected preset level.

In all of the prior art optical recording systems described above, indirect delayed and/or partial means are resorted to in order to achieve error compensation in the recording process. In the practice of the present invention, however, the recordable stratum of the optical recording medium itself actively interacts with the signal being recorded on a feedback power-demand basis to provide sufficient error reduction so that perfect recording may be achievable on one pass. By the system of the present invention, it is possible to achieve significant dropout error reduction in real time, for errors due to variations in the sensitivities of the recordable strata of different recording media, and due to speed variations of the recording media with respect to the recording beams, as well as due to occlusions and other anomalies in the media.

SUMMARY OF THE INVENTION

A system is provided for optically recording binary coded digital and analog data on a recording medium, such as a optical disk, in response to an incoming signal, which is compared with the optical status of the recording medium. The recording medium has reflective and radiation-sensitive characteristics, and it reacts actively with the incoming signal via a slaved-intensity coherent beam from a radiant energy source such as a laser in a manner that recording errors are eliminated or reduced, in real time, to a minimum. The system of the invention utilizes a real time, closed loop feedback system incorporating instantaneous error reduction means. The overall system serves to maximize the accuracy of the data recorded on the medium. The error reduction means is derived from an electrical command signal in combination with an electrical feedback signal derived from a variable beam reflected by the medium itself during the recording process in order to achieve its error reduction function by producing an error or demand signal proportional to the difference between the command and feedback signals, the error signal being used to control the power output of the radiant energy source.

DETAILED DESCRIPTION OF THE ILLUSTRATED EMBODIMENT:

In the quiescent state of the apparatus (FIG. 1), before the recording process begins, a signal input 10, fed through an input terminal 12 of a differential amplifier 14, consists only of a string of "zeros". Since the other input 56 arriving at the differential amplifier also is quiescent, the output of item 14 is correspondingly minimal, as fed to a power amplifier 16.

Figure 1:
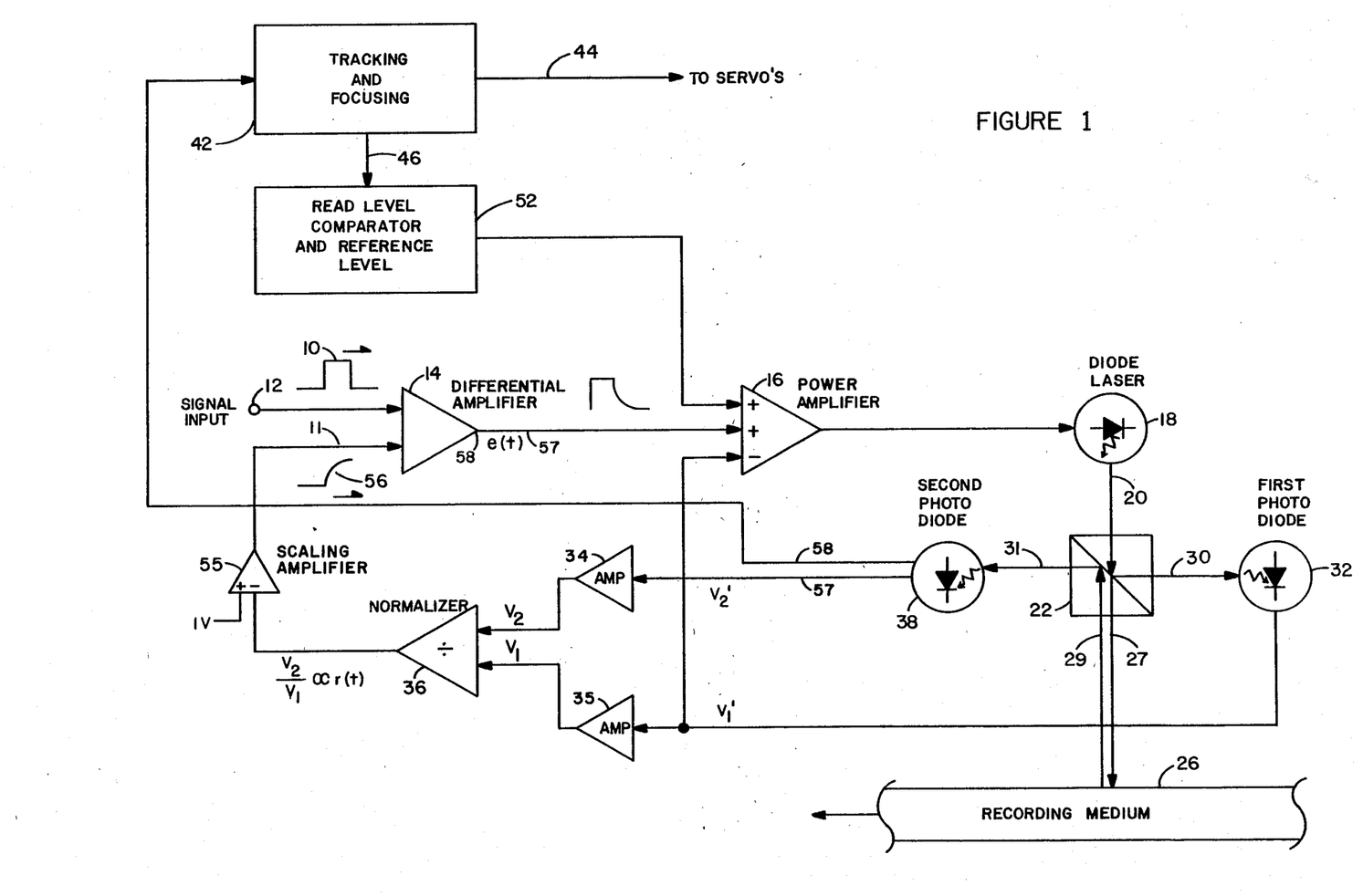
FIG. 1 is a schematic block diagram of one embodiment of a system for recording digital data on a selected medium, such as a video disk, with simplifications being incorporated into the diagram for purposes of clarity.

One function of power amplifier 16 is to provide a low-power output level which will permit groove tracking and focusing at all times. In the quiescent state, therefore, a laser diode 18 is driven at a low power level, illuminating a recording medium 26 through the beam path 20 and 27. A reflected beam 29 is directed partially by a beam splitter 22 via a beam 31 to a second photodiode 38. The electrical output of photodiode 38 enables the tracking and focusing functions as explained in detail below. Photodiode 38 also provides a signal proportional to the reflectivity of medium 26, as will be explained in detail below.

The waveform of an incoming electrical signal to be recorded, illustrated as a single digital one pulse 10, is fed through an input terminal 12 to differential amplifier 14. Pulse 10 may be part of a pulse-code-modulated (PCM) signal of the on-off, high-low, 1-0, or binary type, but is not necessarily limited thereto. Differential amplifier 14 responds to the rising edge of pulse 10 by providing an output which, on passing through power amplifier 16, drives a radiant power source which may be diode laser 18. Diode laser 18 may be any continuous wave single-mode solid state, gas, ion or multimode/etalon laser of visible wavelengths, but more specially of approximately 780 nm.

The output of differential amplifier 14 is amplified by power amplifier 16 to provide a variable power output up to a maximum, the write level permitted by its load, diode laser 18, and to cause light beam 27 to initiate a reaction in the recordable stratum of recording medium 26, which may take the form of an optical disk, to cause a digit of information to commence to be recorded on the medium.

A substantial portion of the source beam 20 emitted by diode laser and transmitted through a beam splitter 22, in the form of an incident beam 20, reaches recordable stratum of the recording medium 26. Beam 20 passes through a conventional collimator, polarizer and triple beam splitter (not shown), which may be formed by conventional diffraction grating techniques, and in which, for example, beam 20 may be split into a main beam 27 and to side lobe tracking beams (not shown) for focusing and tracking purposes.

Beam 20 passes to beam splitter 22 of any appropriate known type, where a first reflected laser beam 30 passes to a first monitor photodiode detector 32. Photodiode detector 32 monitors the instantaneous varying optical output beam 20 of diode laser 18 and provides a first, reference, electrical input signal ($V_1$) proportional to the radiant power output of the laser, to a conventional ratiometer amplifier normalizer 36 through an amplifier 35. The unreflected portion of beam 20 passes through beam splitter 22 and is focused as a recording beam 27 by conventional focusing means (not shown) on the photo-reactive, radiation sensitive and reflective recordable stratum of recording medium 26. Recording medium 26 responds to beam 27 to direct a reflection beam 29 to beam splitter 22 which directs a beam 31 to a second photodiode 38. The remaining portion of beam 29 is blocked from returning to laser diode 18 by polarizing means such as a quarter-wave plate (not shown).

The photo-reactive, radiation-sensitive and reflective recordable stratum of recording medium 26 may be of any reflective type in which signal pulses are recorded as spots of reduced reflectivity, referred to sometimes herein, for simplicity, as spots of non-reflectivity. Typical strata suitable for this purpose include the ablative type, such as described, for example, in U.S. Pat. No. 4,305,081 and 4,290,075, in which the "ones" pulses melt or burn holes in a reflective layer thereby producing non-reflective spots. Other suitable strata may be the displacement type, such as described, for example, in U.S. Pat. Nos. 4,565,772 and 4,577,291, in which a reflective stratum formed, for example, of aluminum, gold or the like, is adhesively attached to an underlying thermally responsive stratum on the recording medium. The various specific types of suitable recording media 26 will be described in more detail subsequently in conjunction with FIGS. 6A-6E.

It is to be understood, of course, that the specific recording media shown in FIGS. 6A-6E do not in any way preclude the suitability of other materials or combinations being used, so long as the desired optical characteristics are achieved, and which actively respond to an incident beam to provide a usable ratio of reflectivity to non-reflectivity during the recording and reproducing cycle.

In the various recording media now known to the art, and which are suitable for use in the system of the present invention, there is a variation with regard to the thermal energy the various media require in order to produce usable "ones" signals in the form of reproduceable non-reflective spots on the surface of each medium. That is, there is a variation in the sensitivity of the different media, assuming that all other conditions are held constant. The system of the present invention takes into account and compensates, in real time, for such variations in sensitivity of the different media, so that the various types of media may be used in the system of the invention interchangeably without the need for readjustments of the source of thermal energy or other functional components. The present invention also compensates in real time for variations in the sensitivity of a particular medium as a function of position on a disc, card, tape or the like, owing to inhomogeneities in the medium.

Photodiode 38 is coupled through an amplifier 34 to normalizer 36 to provide a second electrical input ($V_2$) to normalizer 36.

Reflection beam 29 which illuminates photoiode 38 has a varying intensity, depending on the output of diode laser 18 and also depending on the reflective characteristics of a recording stratum of recording medium 26. Beam 29 further comprises reflected focusing and groove tracking beams. Photodiode 38 is a multifunction component from which focusing and tracking means may be derived by conventional means (not shown) and which provides its tracking and focusing signal output through path 58. Thus, photodiode 38 selects by conventional means the focusing and groove tracking components of beam 29 and applies these components to a tracking and focusing circuit represented by block 42. Tracking and focusing circuit 42 provides by conventional means (not shown) correcting outputs 44 to servo mechanisms to maintain the command beam 27 in focus at a desired point on recording medium 26 and on the proper track on recording medium 26.

A second output 46 of tracking and focusing circuit 42 is compared in a read level comparator and reference level circuit 52 having an adjustable reference signal from a reference source (not shown) therein. The reference source is set at a level such that the groove tracking beam level of intensity is sufficient for electrical optical requirements for the read mode. Read level comparator and reference level component 52 is coupled to power amplifier 16 and controls the groove tracking level output of power amplifier 16 to be at a specified groove tracking level. Any loop error generated through the path of elements 16, 18, 22, 26, 38, 42, 46 and 52 is thereby continuously reduced towards zero to maintain the proper level in either write or read modes.

When the recording medium is brought up to speed, it becomes functionally active. Now, when the pulse of the command waveform 10 shown in FIG. 1 is received, the corresponding beam 20 from laser 18 rises in intensity, as does the recording beam 27 which is focused on the recordable stratum of the recording medium 26. This action creates an increase in the intensity of reflection beams 29, 31 which, in turn, causes photodiode 38 through path 57 to create an initially large feedback signal, resulting in an intially large error or demand signal which causes an increase in the power level of recording beam 27. This initial demand is limited in duration and will be described henceforth as the preheat period.

Normalizer 36 makes an instantaneous and continuous comparison of the output of diode laser 18 by way of the photodiode detector 32, and of the reflectivity of recording medium 26 by way of photodiode detector 38, and therefore yields "a normalized feedback". After "waveform 56," insert "which is truly proportional to the reflectivity of medium 26" waveform 56. Waveform 56 is processed and scaled by amplifier 55 and fed to the other input of differential amplifier 14. The waveform 56 at input 11 to differential amplifier 14 is derived from the ratio of the signals $V_2$ to $V_1$ and serves as the instantaneous power demand signal to differential amplifier 14.

The true reflectivity ($R_t$) is that fraction of the power of laser beam 27 which is reflected as beam 29, which is to say:

$$R_t \sim \frac{V_2}{V_1} \tag{1}$$

When the gains of amplifiers 34 and 35 are set to equalize $V_2$ and $V_1$ during quiescence or "zeros" then:

$$R_t \sim \frac{V_2}{V_1} = 1/1 = 1 \tag{2}$$

And when minimum reflectivity is approached during the recording of a "1"

$$R_t \sim \frac{V_2}{V_1} = 0/1 = 0 \to 0 \tag{3}$$

The instantaneous value of $R_t$ is subtracted from the unity value reference to give $1-R_t$, which as the signal of path 56 causes full reflection to yield zero and minimum reflection to approach unity. The signal of path 56 is connected to the inverting input terminal 11 of differential amplifier 14. The command signal input on input terminal 12 of the apparatus is connected to the non-inverting input of the differential amplifier 14. Thus, the signal 57 on output terminal 58 of differential amplifier 14, which is connected to a non-inverting input terminal of power amplifier 16, is proportional to the difference between the command signal level and the signal $(1-R_t)$. Therefore, the signal 57 at the output terminal 58 of differential amplifier 14 constitutes an error or demand signal which when inputted to power amplifier 16 drives diode laser 18 to a power output level proportional to the above-mentioned difference. It should be noted that for a constant command input signal level, the shape of the error or power demand signal 57 on terminal 58 of differential amplifier 14 is exactly similar to the reflectivity-versus-time plot for recording medium 26.

In the following examples and explanations, only the nominal and first-order effects are given and discussed. Second and higher-order effects are not considered necessary for an understanding of the present invention.

Figure 2A:
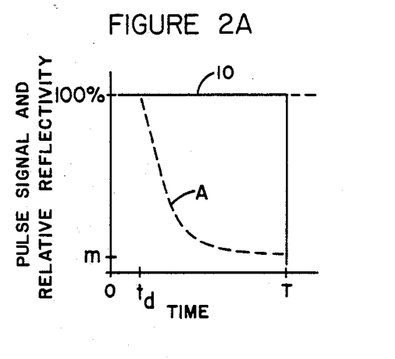
FIGS. 2A and 2B are curves representing the direct dynamic interactions between the recording signals and the recordable stratum of the medium under widely varying conditions, with error reduction.
Figure 2B:
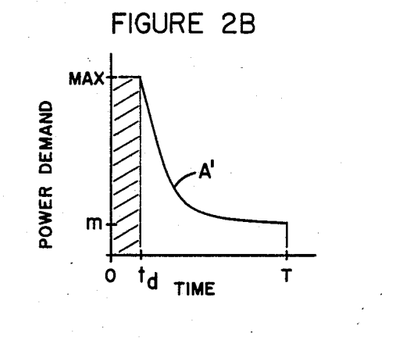

The command pulse 10 (FIG. 1), and the corresponding error, or power demand waveform 57 may be compared, as shown in FIGS. 2A and 2B. In FIG. 2A, the command pulse 10 is defined as 0-100% amplitude. Assuming the recordable stratum of the recording medium 26 to be relatively stationary with respect to the path of the recording command beam 27, the rate of change of relative reflectivity, curve A of FIG. 2A, in response to the pulse signal, reaches some attainable minimum m at time T. The magnitude m is, therefore, the final or net reflectivity attained for approximately the whole volume of the stratum involved. The volume is approximately that of a microcylinder of diameter equal to laser wavelength for the shortest pulse recordable, and the profile of the optical effect resulting would yield the height of the microcylinder, said height as defined by the optical effect.

Curve A' of FIG. 2B a slot of the reflectivity of the recordable stratum of medium 26, and also of the error or power demand signal 57 on output terminal 58 of differential amplifier 14, as a function of time during the period T. The stratum, exhibiting maximum reflectivity when the pulse begins, remains unaffected until time $t_d$. The shaded rectangle, or preheat, defined by the abscissa $O-t_d$ and the ordinate O-MAX, represents the product of power and time, and hence the thermal energy required to raise the temperature of the microcylinder of the stratum being recorded up to the point at which its characteristic optical properties begin to change. The delay $t_d$ occurs because laser 18, less optical loss between the laser and the stratum of the recording medium 26, has limited output. That is, a more powerful laser would decrease the delay by increasing the amplitude of MAX, the amount of preheat being constant.

The shapes of the curves A and A' of FIGS. 2A and 2B are non-linear because, as the reflectivity of the stratum decreases, so also does the error signal. Therefore, as the reflectivity approaches the attainable minimum m, there is so little incremental drop in reflectivity, hence power demand, that the slopes of the curves A, A' near time T are essentially horizontal. The capacity of the system of the present invention to produce such an asymptotically horizontal segment is important in the process of error reduction, as will be explained.

Figure 7:
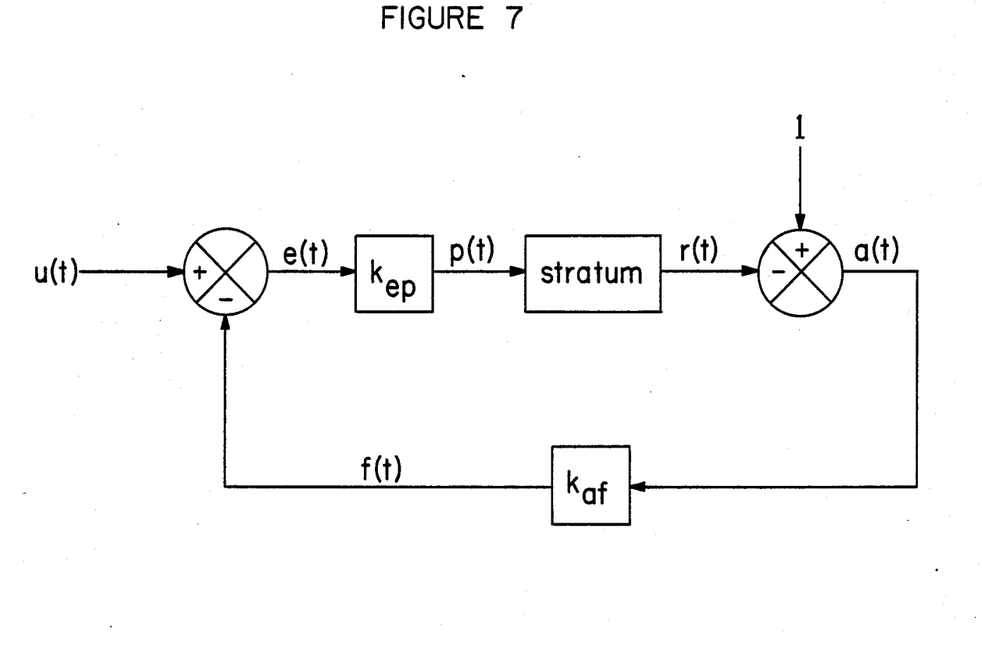
FIG. 7 is a simplified block diagram of the invention to demonstrate exponential nature of stratum reflectivity.

To obtain a derivation of the exponential nature of stratum reflectivity a simplified block diagram of the invention is shown in FIG. 7. In FIG. 7, the response of the laser is assumed linear and all delays in the system dynamics are ignored, and u(t) = input signal to be recorded (10)

f(t) = feedback signal (56)

e(t) = differential error signal (56) $u(t) - K_{af}a(t)$ p(t) = laser power level (20)

r(t) = stratum reflectivity a(t) = stratum absorption, $a(t) = 1 - r(t)$ $k_{ep}$ = laser power gain factor $k_{af}$ = absorption scale factor t = time From this model it may be stated that:

$$p(t) = k_{ep}[u(t) - k_{af}a(t)] = k_{ap}\,e(t)$$
$$= k_{ep}\{u(t) - k_{af}[1 - r(t)]\}$$
$$= k_{ep}[u(t) - k_{af}] + k_{ep}k_{af}r(t)$$

Now assuming the rate of change of stratum reflectivity is proportional to the laser power:

$$d[r(t)]/dt = -k_{pr}p(t)$$

where:
d()/dt = differential operator
$k_{pr}$ = laser power to reflectivity proportionality factor
thus:

$$d[r(t)]/dt = -k_{pr}k_{ep}k_{af}r(t) + k_{pr}k_{ep}[K_{af} - u(t)]$$

This is a first order linear differential equation having a well known solution. In the case when u(t) has constant value u, as in the case when the signal to be recorded is a digital "one", then the solutions to r(t) and to p(t) describe exponential signals:

$$r(t) = r(0)e^{-(k_{pr}k_{ep}k_{af})t} + [1 - e^{-(k_{pr}k_{ep}k_{af})t}](k_{af} - u)/k_{af}$$

$$p(t) = k_{ep}(u - k_{af}) + k_{ep}k_{af}r(t)$$

where r(0) is the initial value of stratum reflectivity prior to applying the constant input signal, u, and $e^0$ is the exponential function.

Curve A/ of FIG. 2B, representing the thermal demand, i.e., laser power level determined by amplified error signal required to attain curve A of FIG. 2A, may vary widely according to normal variations in the sensitivity of the recordable stratum required to cause a specified amount of change in reflectivity but especially during the abnormal microscopic anomalies encountered during the recording. For a given thickness of stratum, a range of greater and lesser sensitivities, that is, energy units per unit volume of stratum, results in a downward or upward shift of curve A' of FIG. 2B. Similarly, for a given sensitivity, a range of greater of lesser thicknesses will directly shift curve A' vertically. Furthermore, for a given MAX value of power available, a range of specific heats of the recordable stratum will directly shift the position of $t_d$, causing the preheat demand, the shaded area, to vary correspondingly.

Figure 3A:
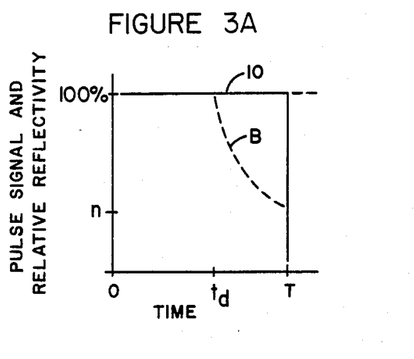
FIGS. 3A and 3B are curves similar to the curves of FIGS. 2A and 2B, but representing more widely varying conditions, likewise with successful error reduction.
Figure 3B:
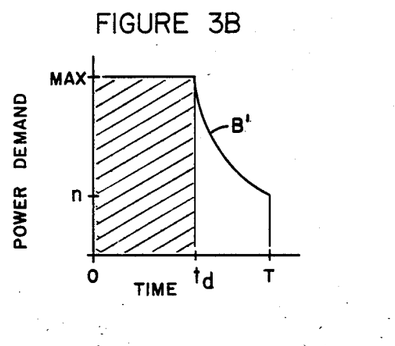

In FIGS. 3A and 3B, an example is given of a gross variation or microscopic anomaly such that the recordable stratum of the medium 26 has a combined lower sensitivity, greater thickness and higher specific heat. Because of the increase in thickness a larger volume of stratum must be heated, and the greater specific heat requires more thermal energy per unit volume. Hence the shaded area of FIG. 3B is enlarged with respect to the corresponding area of FIG. 2B, the MAX power being constant; and the period $0 - t_d$ is lengthened to the right. This results in a delayed onset of drop in reflectivity. The invented system senses said delay and compensates for it by extending the duration of the shaded area of FIG. 3B.

The curve B' of FIG. 3B is raised vertically as compared with the curve A' of FIG. 2A for the same reasons in order to terminate at time T with a significantly increased amplitude n as compared with the amplitude m in FIG. 2B. The overall shift of curve B' in FIG. 3B to the right and upwardly represents the added power demand resulting in curve B of FIG. 3A which terminates in n at slightly above the normal value m of FIG. 2A. This slight increase resulting in a slight increase in read-out signal which is tolerable, results from the disappearance of the short horizontal segment and more as compared with the curve A of FIG. 2A. The signal as recorded on the conditions of FIGS. 3A and 3B is usable. The invented system compensates for the increased power requirements of this microspot by increasing the power applied to said spot thereby converting what would be a dropout in the prior art to an acceptable recording.

Figure 4A:
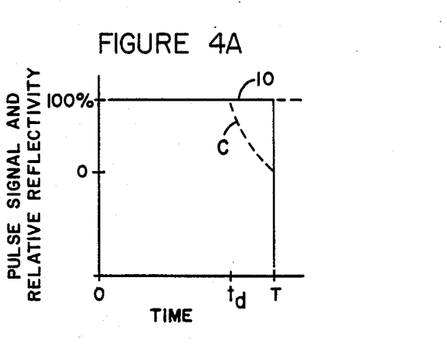
FIGS. 4A and 4B are curves similar to the curves of FIGS. 2A and 2B, but representing widely varying conditions extending to extremes beyond the limits of the system capacity, without successful error reduction.
Figure 4B:
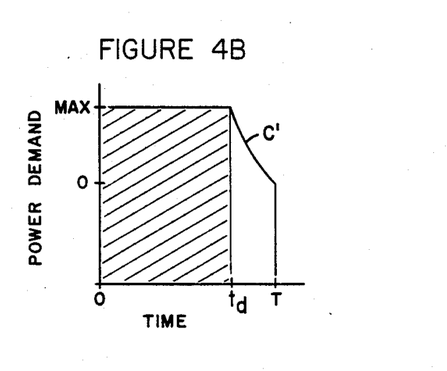

In FIGS. 4A and 4B, on the other hand, the example of FIGS. 3A and 3B is treated once again, but with such increases of power demand that the MAX available is not enought and the net drop in reflectivity is probably not usable. An error in recording, known as dropout, may result under the conditions of FIGS. 4A and 4B. The invented system in this case is unable to supply the power required to record the microspot, hence a dropout will occur during recording.

Figure 5A:
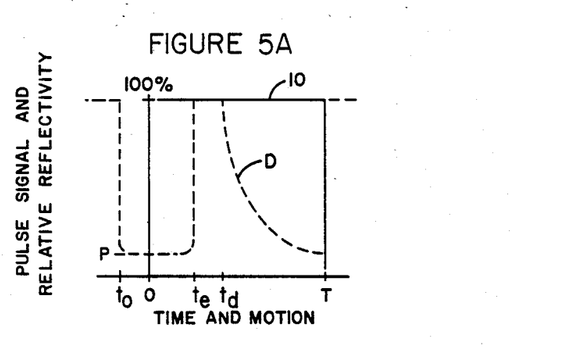
FIGS. 5A and 5B are curves similar to the curves of FIGS. 2A and 2B, but under conditions of a microocclusion, with successful error reduction.
Figure 5B:
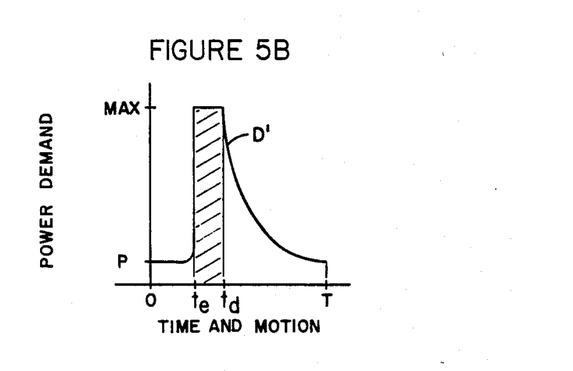

In FIGS. 5A and 5B there is illustrated error reduction arising from the presence of a partial occlusion in the recordable stratum of the medium 26 capable of interfering with the recording process. In the previous examples of FIGS. 2A, 2B, 3A, 3B, 4A, 4B, the simplifying assumption was made that the recordable stratum was stationary with respect to the balance of the system. In the case of the example of FIGS. 5A and 5B, however, relative motion between the recordable stratum and the other components of the system must be taken into account. The occlusion in the stratum causes a loss of relative reflectivity during the period between $t_o$ and $t_e$, which also overlaps for the period $t_e-0$ into the pulse signal period from O-T. Therefore, there is no power demand until time $t_e$, at which point the normal recording process may resume. The period between $t_e$ and T permitting, the curve D achieves a nearly horizontal segment near the ordinate T, and the usual value of minimum reflectivity p is attained. In the case of the moveable optical medium, such as a video disk, as opposed to other recording media such as sheets, cards or cylinders, the relative speed of the recordable stratum with respect to the recording beam at the outermost radius $r_0$ is approximately twice that of the innermost usable radius $r_i$. If the disk is to be employed in the constant-angular-velocity (CAV) mode, then the recordable signal pulse period T at the radius $r_i$ requires an arc whose subtended angle at the radius $r_o$ results in arc of twice the length for the same period. The nominal volume of recordable substrate at $r_o$ is not merely twice that of $r_i$ but $$\frac{4+\pi}{\pi} - 2 = 0.27 \qquad (4)$$

or 27% more than twice. In the system of the present invention, the increasing power demand from 100% at $r_i$ to 227% at $r_o$ is accommodated by the proportionally increasing thermal energy defined by the area under the power demand curve, and no external means is required.

In the above examples, it has been demonstrated that by the means described there is a continuous dynamic effort toward error elimination, which may be successful within the limits of a given system design but unsuccessful beyond those limits, the result being a net reduction of recorded errors or dropouts.

To sum up the operation of the system of the invention, and as explained above, recording medium 26 itself controls the amount of power, or energy per bit, needed from diode laser 18 for recording data on the recording medium with a minimum of dropouts. When the system is first activated, the circuit of block 52 supplies a minimum reference power level to power amplifier 16. Power amplifier 16 amplifier, accordingly supplies only sufficient power to diode laser 18 to cause the laser to emit a low-level read, tracking and focusing beam 20.

Figure 6A:
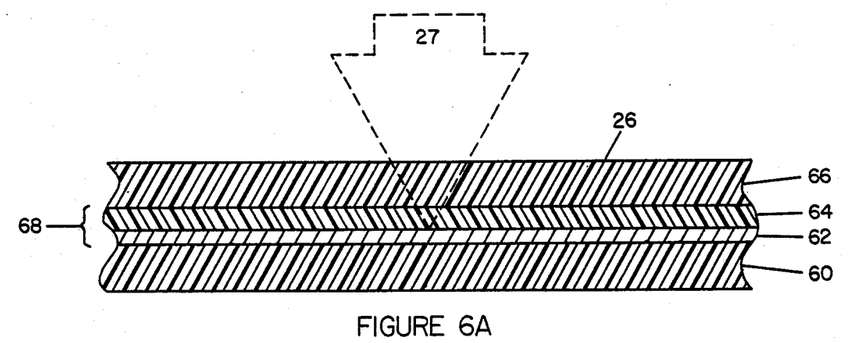
FIG. 6A illustrates an unrecorded state of a typical recording medium that may be used in the system of the present invention.

Referring now to FIGS. 6A-6E, an explanation will be given to describe different types of recording media 26 as illustrated in schematic sectional side views. One type of recording medium 26 that may be utilized in the system of the invention is illustrated in FIG. 6A. FIG. 6A shows a sectional side view of a known type optical disk consisting of four layers. The recording medium comprises a compliant substate first layer 60, a thin and malleable reflective second layer 62, a radiation-sensitive third layer 64, and a transparent protective fourth layer 66. A recordable stratum 68 of recording medium 26 in FIG. 6A essentially consists of the second and third layers 62 and 64, upon which the transmitted beam 27 is focused. The recordable stratum may consist of any reflective type material in which signal pulses are recorded as non-reflective spots.

Figure 6B:
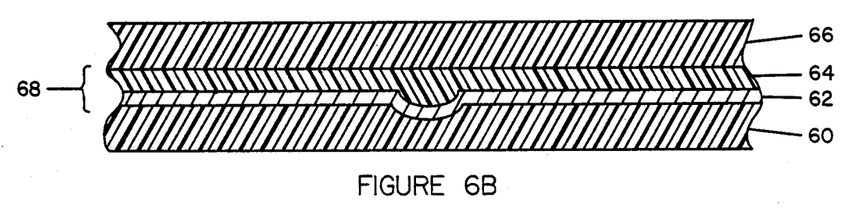
FIG. 6B illustrates a recorded bit of information wherein a radiation-sensitive stratum in the medium expands in reaction to incident radiation.
Figure 6C:
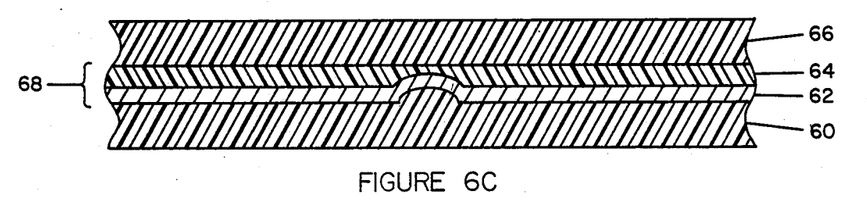
FIG. 6C illustrates a recorded bit of information wherein the radiation-sensitive stratum within the medium contracts by cold crystallization in reaction to incident radiation.
Figure 6D:
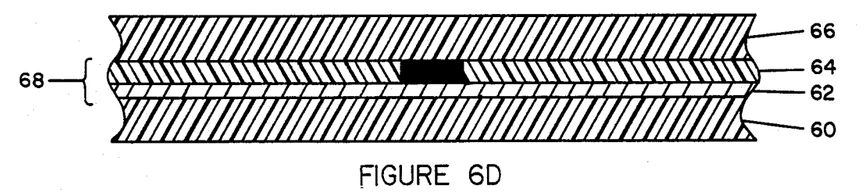
FIG. 6D illustrates a recorded bit of information wherein the radiation-sensitive stratum of the recording medium occludes in reaction to incident radiation.
Figure 6E:
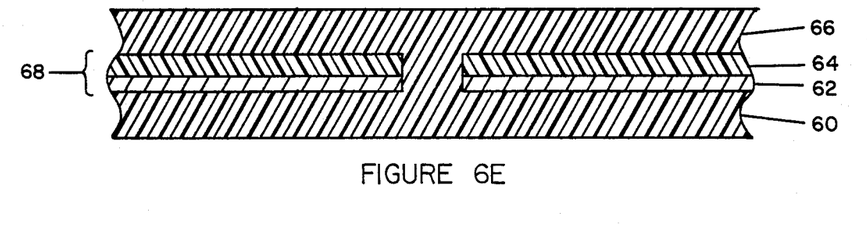
FIG. 6E illustrates a recorded bit of information wherein a hole is burned completely through radiation-sensitive and reflective strate within the recording medium.

Typical stratum may be the ablative type in which the "ones" pulses melt or burn holes in the stratum as shown in FIG. 6E causing the stratum to become non-reflective. Stratum 68, on the other hand, may be of the displacement type, in which a reflective layer 62 formed, for example, of aluminum, gold, or other suitable material, is adhesively attached to a thermally responsive, radiation sensitive layer 64. The reflective layer 62 is mechanically displaced by chemical means in the reactive, radiation-sensitive layer 64 to a suitable fraction of the wavelength of the coherent source of thermal energy such as diode laser 18. Such a displacement will result in reduced reflectivity at the displaced point due to optical interference or dispersion phenomena. Such displacement may occur by expansion of third layer 64 as illustrated in FIG. 6B, or by crystallization or contraction of layer 64 in FIG. 6C. Chemical means which would cause expansion of third layer 64 away from the energy source as illustrated in FIG. 6B may include nitrocellulose. Chemical means which would cause cold crystallization or chontrction of the third layer 64 toward the energy source as illustrated in FIG. 6C may include polyethylene terephthalate, or the like.

Alternatively, third layer 64 may become occluded and less transmissive to light upon being irradiated by beam 27 as illustrated in FIG. 6D.

It will be appreciated that while a particular embodiment of the invention has been shown and described, modifications may be made. It is intended in the claims to cover all modifications which come within the true spirit and scope of the invention.

We claim:

1. An optical recording system for recording data on a radiation-sensitive stratum in an optical recording medium including;
    (a) a radiation source,
    (b) control means for electrically controlling the power output of said radiation source,
    (c) means for directing energy emitted by said radiation source onto said radiation-sensitive stratum,
    (d) means for sensing a change in an optical property of said stratum during irradiation of said stratum by said radiation source, said sensing means providing a feedback signal simultaneously with said irradiation,
    (e) means for comparing said feedback signal with an input command signal to produce an error signal, and
    (f) means operatively connected to said comparison means and said control means for continuously varying the power output of said radiation source in response to said error signal in real time.

2. The optical recording system defined in claim 1, in which said comparing means comprises a differential amplifier.

3. A recording medium according to claim 2 wherein said photo sensitive second layer is superimposed with a highly transparent protective third layer.

4. The optical recording system of claim 1 in which said feedback signal has an instantaneous value proportional to $1 - R_t$, where $R_t$ is the value of the reflectivity of said stratum.

5. An optical recording system according to claim 1 wherein said recording medium consists of a compliant planar substrate having superimposed thereon at least one first layer consisting of reflective material and at least one photo-sensitive second layer, contiguous to said first layer, consisting of photo sensitive material which reacts to radiation incident thereon.

6. An optical recording system for recording data on a radiation-sensitive stratum in an optical recording medium including;
 (a) means for directing onto said stratum an incident radiant beam modulated to contain data in accordance with a command input signal to be recorded on said recording medium, said radiant beam causing said recording medium to emit a secondary radiant beam inversely representing the power required by said stratum to record the data of said incident beam, and
 (b) means for comparing substantially in real time the amplitudes of said command input signal and said secondary beam to control the power level of said incident beam and to maintain said incident beam at the power level required by said stratum to properly record said data.

7. The optical recording system in claim 6, in which said incident and secondary radiant beams are light beams, and which said system includes a coherent light source for generating said incident light beam, and optical means for focusing said incident light beam, on said stratum, and in which said system said comparing means control the power level of said source.

8. The system defined in claim 7, in which said coherent light source is a laser.

9. The system defined in claim 7, in which said radiation sensitive stratum of said recording medium is normally reflective and said data are recorded thereon by reduced-reflectivity spot formed by said incident beam.

10. The system defined in claim 9, in which said secondary beam is formed by reflection of said incident beam by said stratum.

11. The system defined in claim 9, in which the area of each spot on said stratum representing said data is initially optically non-reactive to said incident beam within a first finite time interval, but thermally reactive to produce a rise in temperature in said stratum with no drop in reflectivity to establish said secondary beam at its maximum power level and cause said comparing means to provide maximum power to said incident beam.

12. The system defined in claim 11, in which the area of each spot on said stratum representing data subsequently reacts to said incident beam during a second finite time interval immediately following the first finite time interval and during which said second interval the reflectivity of said stratum decreases to decrease the power of said secondary beam and cause said comparing means to decrease the power in said incident beam.

13. The system defined in claim 12, and which includes electrical circuitry for establishing the minimum power level of said incident beam at a predetermined minimum bias value which provides a continuous secondary beam for monitoring the reflectivity of said stratum.

14. The system defined in claim 13, and which includes electric circuitry for causing the power level of the command beam to decrease from the maximum power level to the minimum power level during the second time interval on an exponential relationship.

15. An optical recording system comprising:
 (a) a recording medium having both reflective and radiation-sensitive reactive characteristics,
 (b) radiation source beam means configured to irradiate said recording medium with a radiant energy beam,
 (c) beam splitting means disposed between said radiation source beam means and said recording medium for for transmitting an incident beam onto said recording medium, for reflecting a portion of said source beam to a first location, and for reflecting a portion of the incident beam which is reflected from said recorded medium to a second location,
 (d) means for causing said recording medium to move with respect to said transmitted incident beam,
 (e) first detecting means at said first location for monitoring the power level of said incident beam,
 (f) second, reflection detection means at said second location for monitoring the power level of said signal reflected from said recording medium,
 (g) normalizing means coupled to said first, incident power detecting means and to said second, reflection detection means for obtaining an absolute value feedback signal proportional to the instantaneous reflectivity of said recording medium,
 (h) differencing means coupled to said normalizing means and to an input command signal to be recorded for producing a error drive signal for said radiation source means inversely proportional to the instantaneous reflectivity of said recording medium,
 (i) read level comparator and reference level means, coupled to said second, reflection detecting means, for adjusting a read level in excess of a fixed reference level in response to average reflectivity of said recording medium, and
 (j) threshold driver means coupling said differencing means, and said first and second beam reflection detecting means to said radiation source means for powering said radiation source means at a real-time feedback controlled, continuous read level output and for powering said radiation source means at an intermittent write level output dependent upon the output level of said differencing means.

* * * * *